US010346427B2

(12) United States Patent
Futatsugi

(10) Patent No.: US 10,346,427 B2
(45) Date of Patent: Jul. 9, 2019

(54) DATA SYNCHRONIZATION METHOD, DATA SYNCHRONIZATION APPARATUS, AND STORAGE MEDIUM FOR SYNCHRONIZING DATA AMONG A PLURALITY OF DATABASES

(71) Applicant: CANON KABUSHIKI KAISHA, Tokyo (JP)

(72) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 14/504,142

(22) Filed: Oct. 1, 2014

(65) Prior Publication Data
US 2015/0095280 A1   Apr. 2, 2015

(30) Foreign Application Priority Data
Oct. 2, 2013   (JP) .................................. 2013-207069

(51) Int. Cl.
G06F 17/30   (2006.01)
G06F 16/27   (2019.01)

(52) U.S. Cl.
CPC ................. G06F 16/273 (2019.01)

(58) Field of Classification Search
None
See application file for complete search history.

(56) References Cited

U.S. PATENT DOCUMENTS

| 6,256,634 | B1 * | 7/2001 | Moshaiov | ......... G06F 17/30008 |
| 7,200,720 | B1 * | 4/2007 | Yang | ................. G06F 17/30348 707/999.2 |
| 2002/0059299 | A1 * | 5/2002 | Spaey | ..................... G06F 16/27 |
| 2003/0140050 | A1 * | 7/2003 | Li | ..................... G06F 17/30578 |
| 2008/0077701 | A1 * | 3/2008 | Kongalath | .............. H04L 12/18 709/232 |
| 2008/0144601 | A1 * | 6/2008 | Nurminen | ........... H04L 67/1095 370/350 |
| 2009/0254589 | A1 * | 10/2009 | Nair | ................... G06F 17/30581 |
| 2010/0235321 | A1 * | 9/2010 | Shukla | .................... H04L 67/10 707/610 |

(Continued)

FOREIGN PATENT DOCUMENTS

JP   11-219309 A   8/1999
JP   2009-541882 A   11/2009

*Primary Examiner* — Thu N Nguyen
(74) *Attorney, Agent, or Firm* — Canon U.S.A., Inc. IP Division

(57) ABSTRACT

In a method for writing data having been subjected to transaction processing in a synchronization source database to data in a synchronization destination database, a synchronization processing management unit of the synchronization destination database requests, as synchronization target data, first data that is a part of the data having been subjected to the transaction processing from the synchronization source database, receives at least the first data from the synchronization source database, performs first synchronization processing on the first data in a cache memory, and performs second synchronization processing on second data, in the synchronization destination database, which has been processed in a same transaction as a transaction in which the first data has been processed in the synchronization source database.

12 Claims, 25 Drawing Sheets

(56) References Cited

U.S. PATENT DOCUMENTS

| | | | | |
|---|---|---|---|---|
| 2010/0274759 A1* | 10/2010 | Takeuchi | ............. | G06F 16/275 |
| | | | | 707/624 |
| 2012/0191735 A1* | 7/2012 | Duff | ..................... | H04L 67/14 |
| | | | | 707/756 |
| 2012/0311667 A1* | 12/2012 | Ohta | ................... | G06F 21/604 |
| | | | | 726/2 |
| 2013/0179186 A1* | 7/2013 | Birtwhistle | ....... | G06F 17/30578 |
| | | | | 705/3 |

* cited by examiner

FIG.3A

| COLUMN NAME | DATA TYPE |
|---|---|
| 301 — USER IDENTIFIER | TEXT |
| 302 — APPLICATION IDENTIFIER | INTEGER |
| 303 — USER AUTHORITY | INTEGER |

FIG.3B

| COLUMN NAME | DATA TYPE |
|---|---|
| 311 — USER IDENTIFIER | TEXT |
| 312 — APPLICATION IDENTIFIER | INTEGER |
| 313 — USER AUTHORITY | INTEGER |
| 314 — TRANSACTION ID | INTEGER |

FIG.4

| | USER IDENTIFIER | APPLICATION IDENTIFIER | USER AUTHORITY |
|---|---|---|---|
| 401 | User001 | 1001 | 4 |
| 402 | User001 | 1002 | 1 |
| 403 | User002 | 1001 | 2 |
| 404 | User002 | 1005 | 1 |
| 405 | User002 | 1009 | 0 |
| 406 | User003 | 1001 | 2 |

FIG.5

| | USER IDENTIFIER | APPLICATION IDENTIFIER | USER AUTHORITY |
|---|---|---|---|
| 501 | User001 | 1001 | 4 |
| 502 | User001 | 1002 | 1 |

FIG.6

| | USER IDENTIFIER | APPLICATION IDENTIFIER | USER AUTHORITY | TRANSACTION ID |
|---|---|---|---|---|
| 601 | User001 | 1001 | 4 | 10 |
| 602 | User001 | 1002 | 1 | 8 |
| 603 | User002 | 1001 | 2 | 10 |
| 604 | User002 | 1005 | 1 | 4 |
| 605 | User002 | 1009 | 0 | 2 |
| 606 | User003 | 1001 | 2 | 9 |

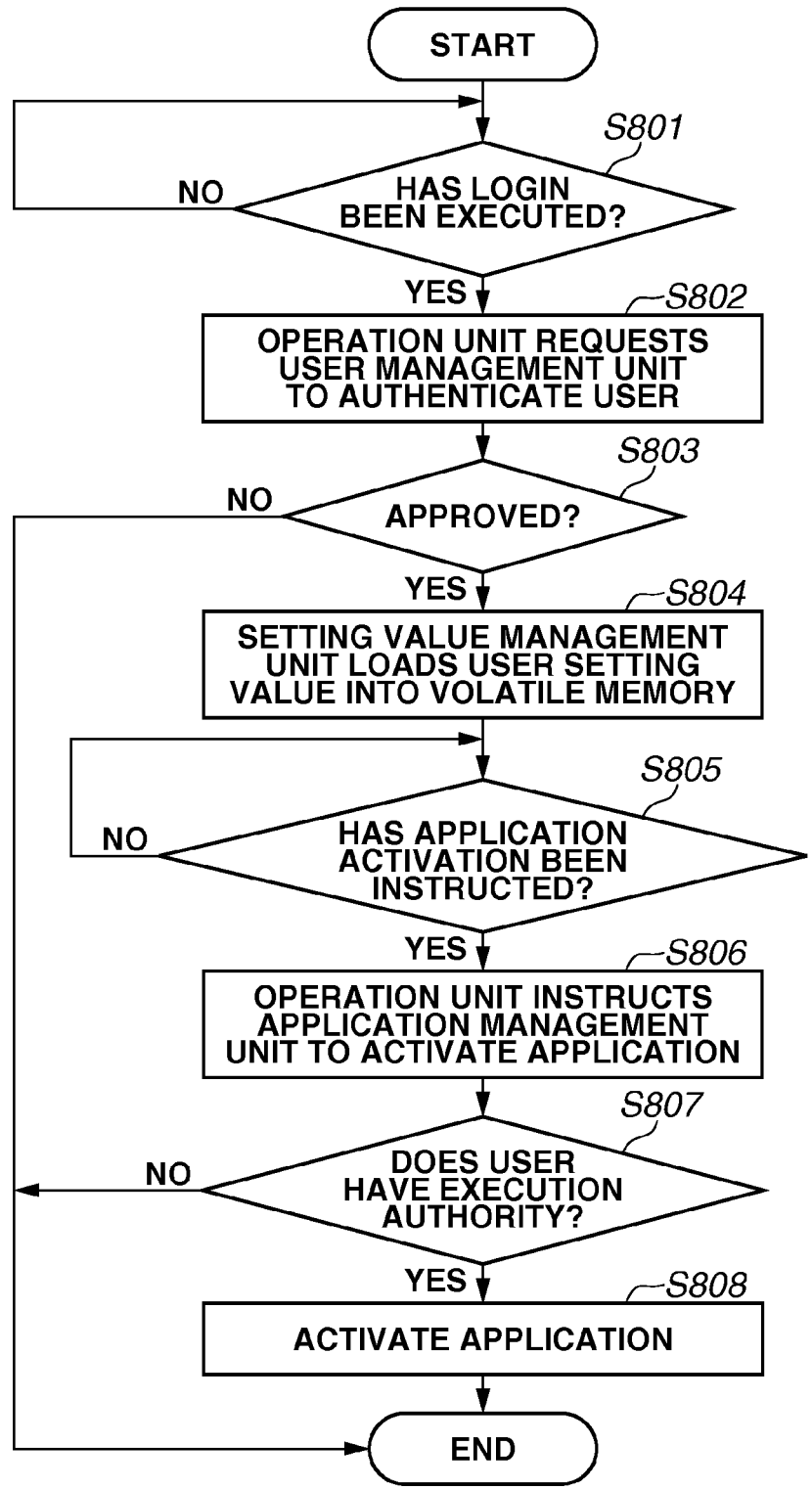

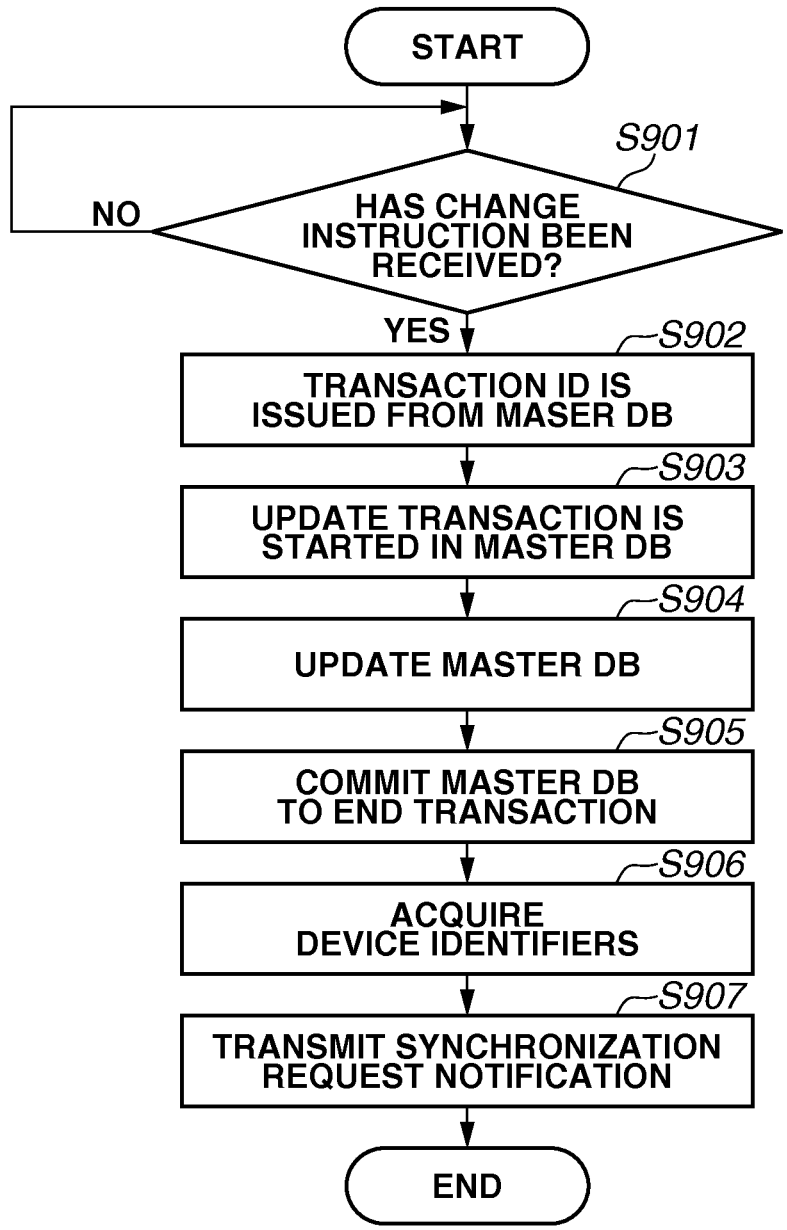

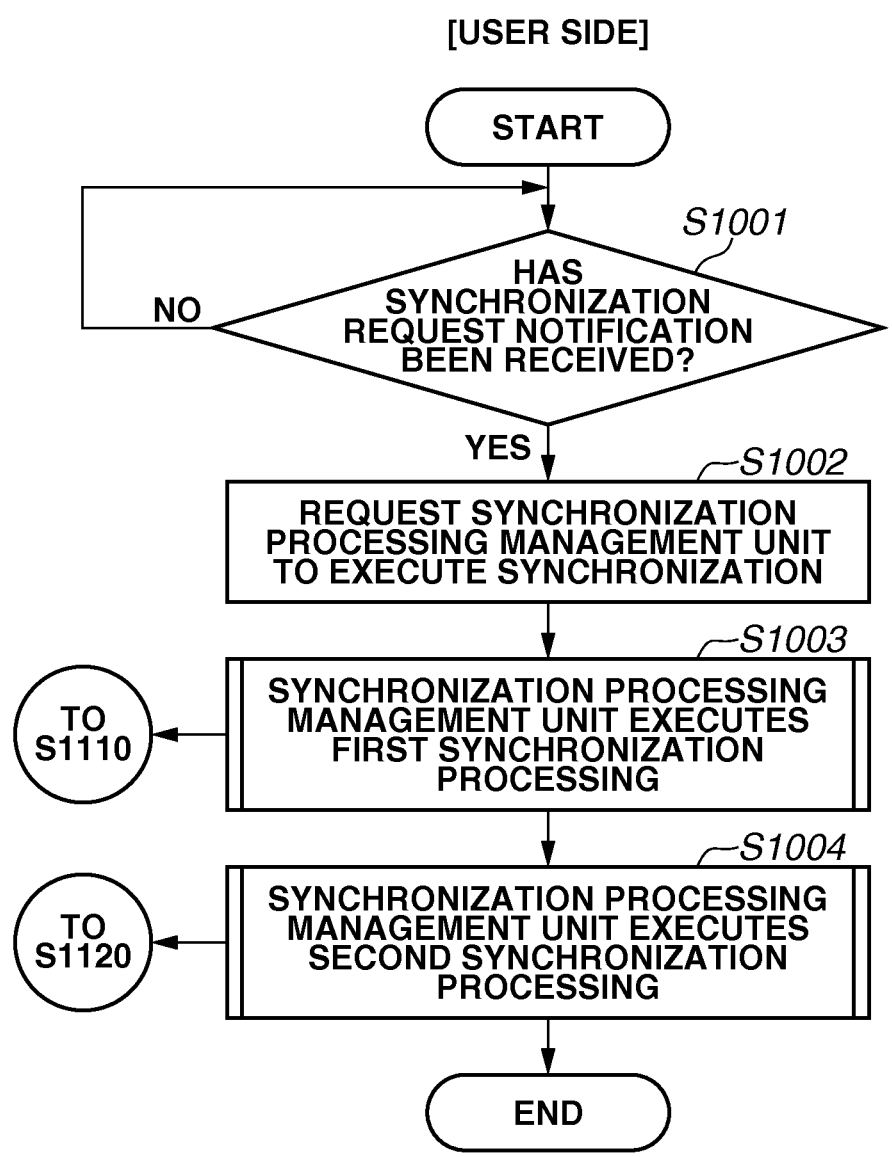

FIG.12

| | USER IDENTIFIER | APPLICATION IDENTIFIER | USER AUTHORITY | TRANSACTION ID |
|---|---|---|---|---|
| 1201 | User001 | 1001 | 1 | 11 |
| 602 | User001 | 1002 | 1 | 8 |
| 1203 | User002 | 1001 | 1 | 11 |
| 604 | User002 | 1005 | 1 | 4 |
| 605 | User002 | 1009 | 0 | 2 |
| 1206 | User003 | 1001 | 1 | 11 |

FIG.13

| DATA ITEM | VALUE |
|---|---|
| 1301 — TRANSACTION ID | 11 |
| 1302 — APPLICATION IDENTIFIER | 1001 |
| 1303 — USER IDENTIFIER | User001 |

FIG.14A

| | USER IDENTIFIER | APPLICATION IDENTIFIER | USER AUTHORITY |
|---|---|---|---|
| 1401 | User001 | 1001 | 1 |
| 502 | User001 | 1002 | 1 |

FIG.14B

| | USER IDENTIFIER | APPLICATION IDENTIFIER | USER AUTHORITY |
|---|---|---|---|
| 401 | User001 | 1001 | 4 |
| 402 | User001 | 1002 | 1 |
| 403 | User002 | 1001 | 2 |
| 404 | User002 | 1005 | 1 |
| 405 | User002 | 1009 | 0 |
| 406 | User003 | 1001 | 2 |

FIG.15

| | DATA ITEM | VALUE |
|---|---|---|
| 1501 | TRANSACTION ID | 11 |
| 1502 | APPLICATION IDENTIFIER | |
| 1503 | USER IDENTIFIER | |

FIG.16A

| | USER IDENTIFIER | APPLICATION IDENTIFIER | USER AUTHORITY |
|---|---|---|---|
| 1401 | User001 | 1001 | 1 |
| 502 | User001 | 1002 | 1 |

FIG.16B

| | USER IDENTIFIER | APPLICATION IDENTIFIER | USER AUTHORITY |
|---|---|---|---|
| 1601 | User001 | 1001 | 1 |
| 402 | User001 | 1002 | 1 |
| 1603 | User002 | 1001 | 1 |
| 404 | User002 | 1005 | 1 |
| 405 | User002 | 1009 | 0 |
| 1606 | User003 | 1001 | 1 |

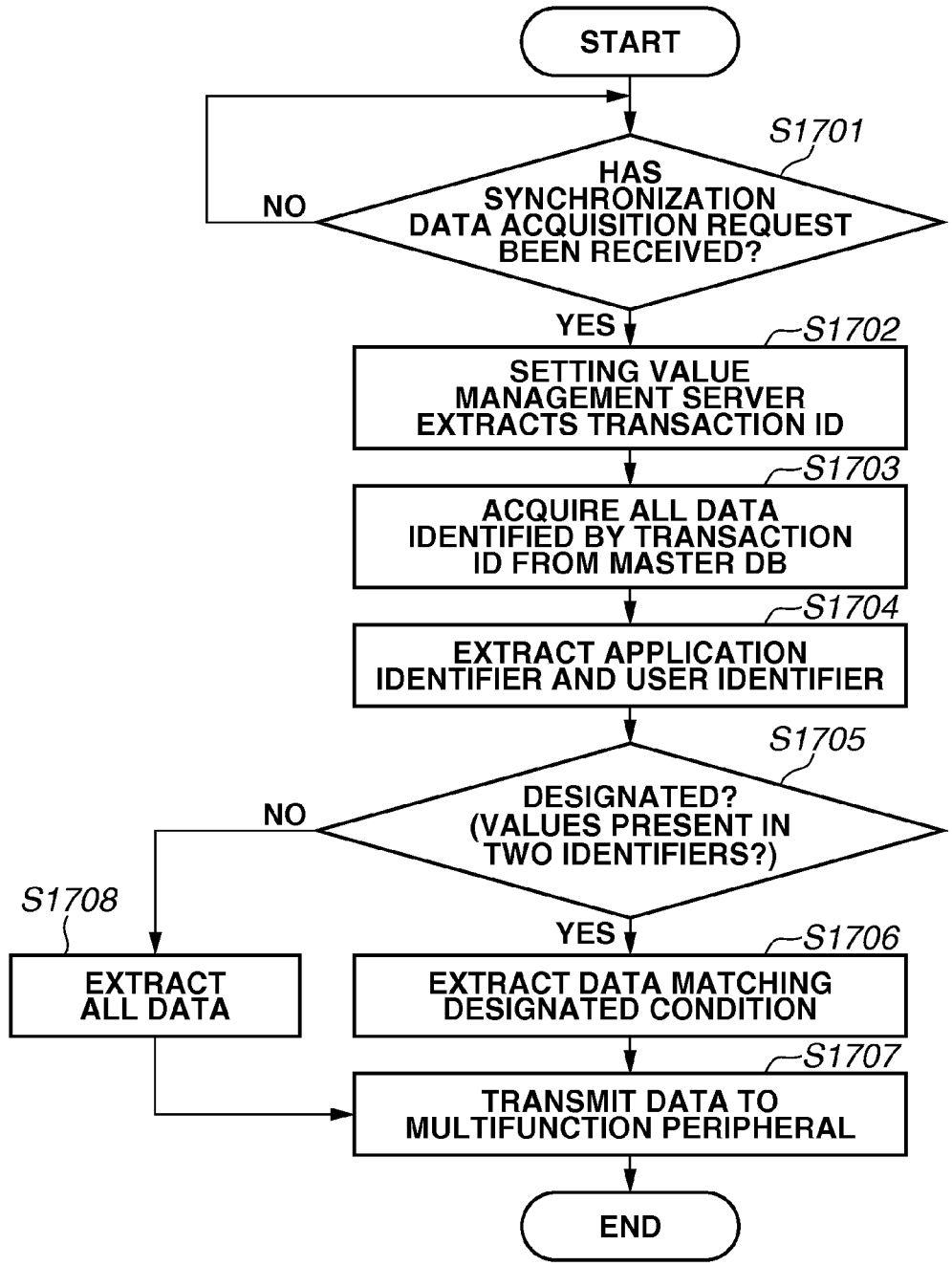

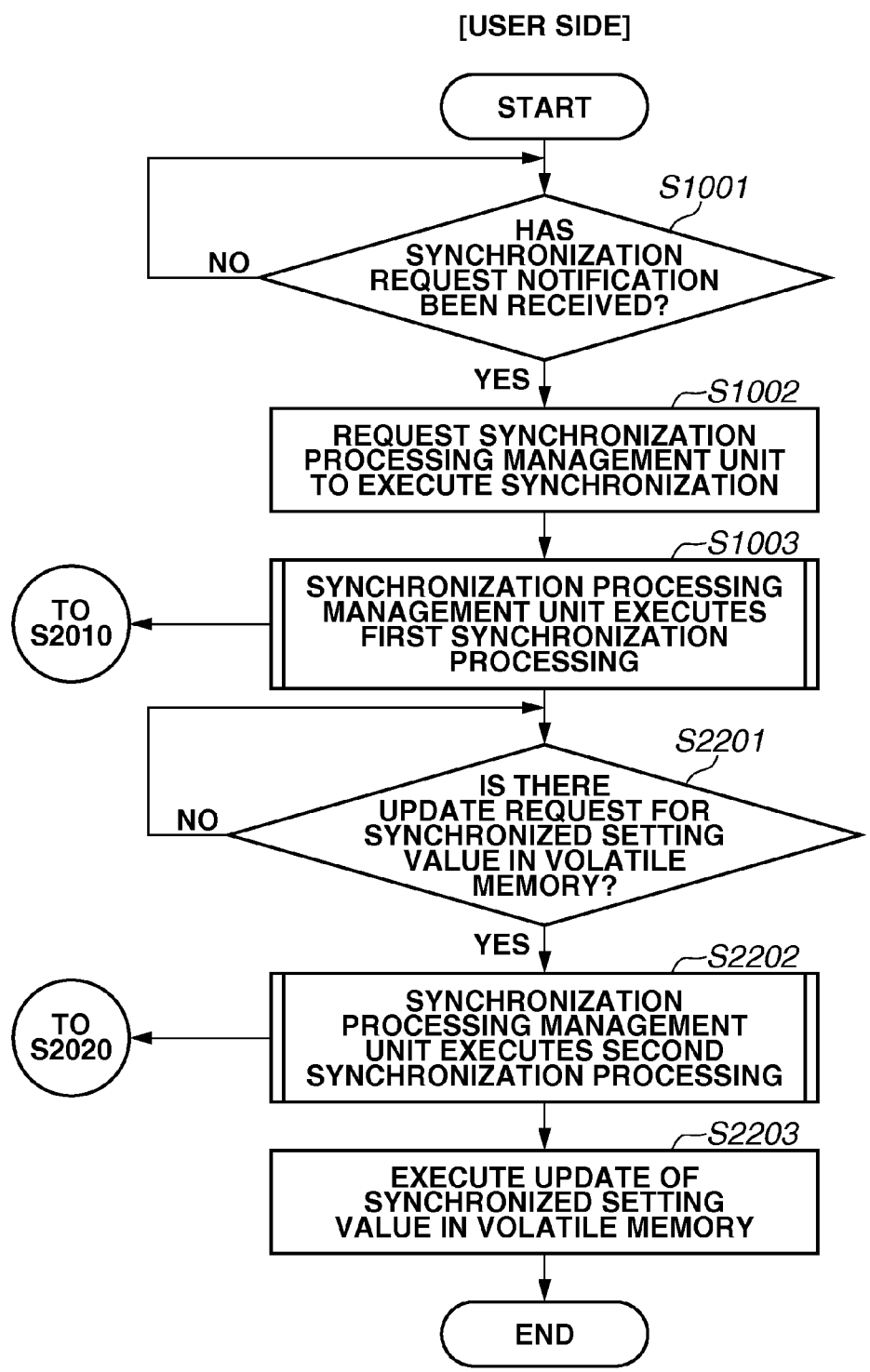

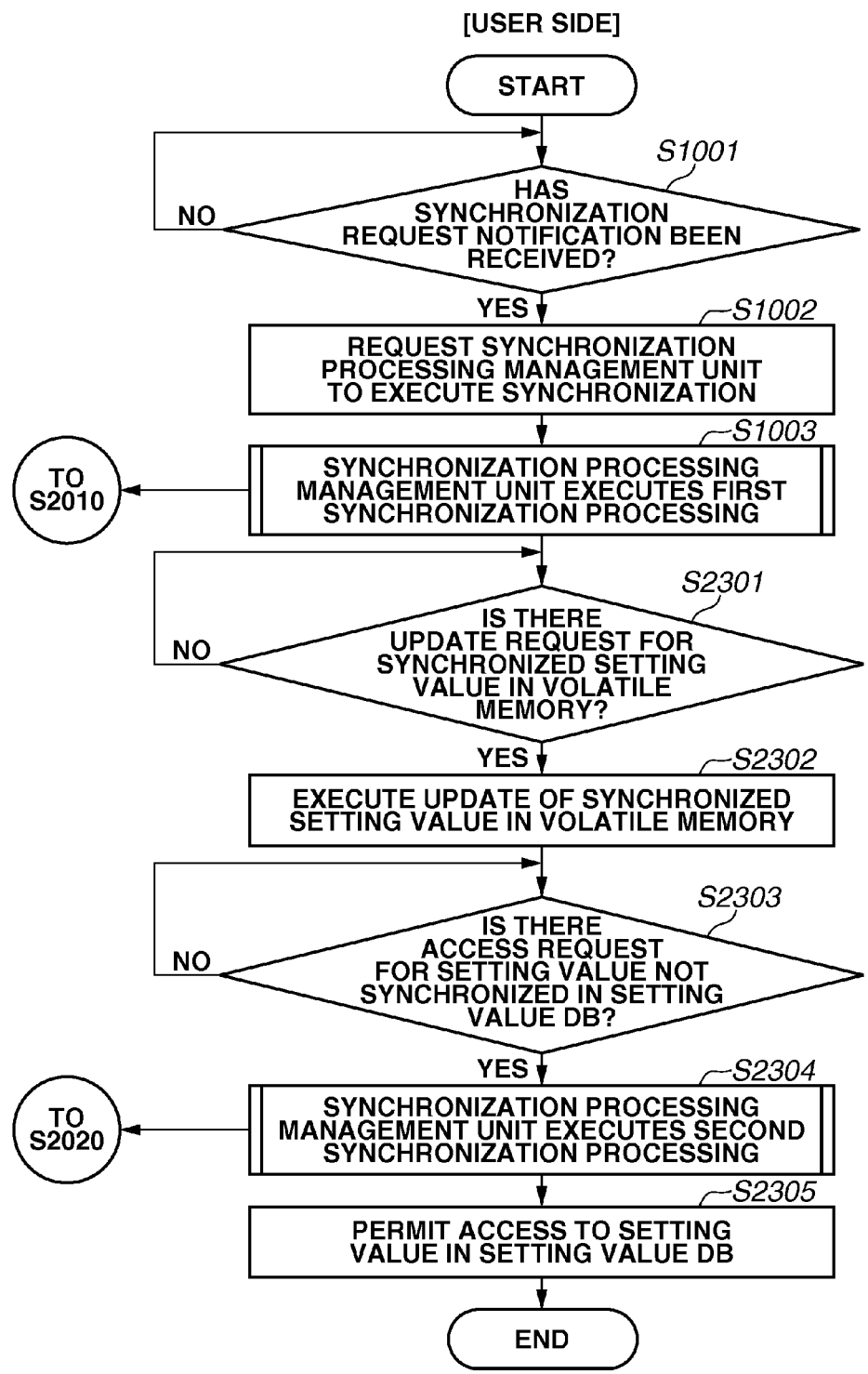

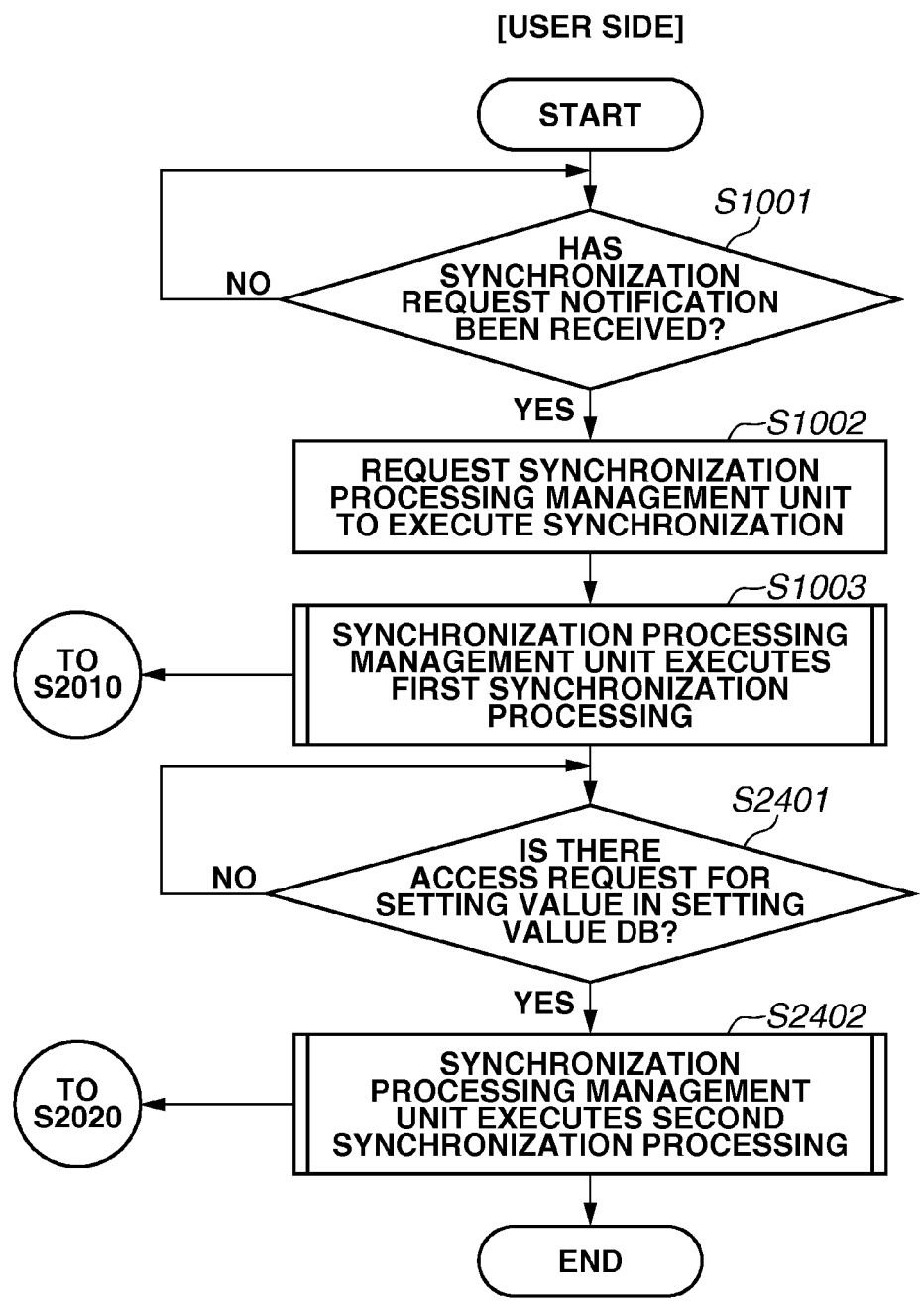

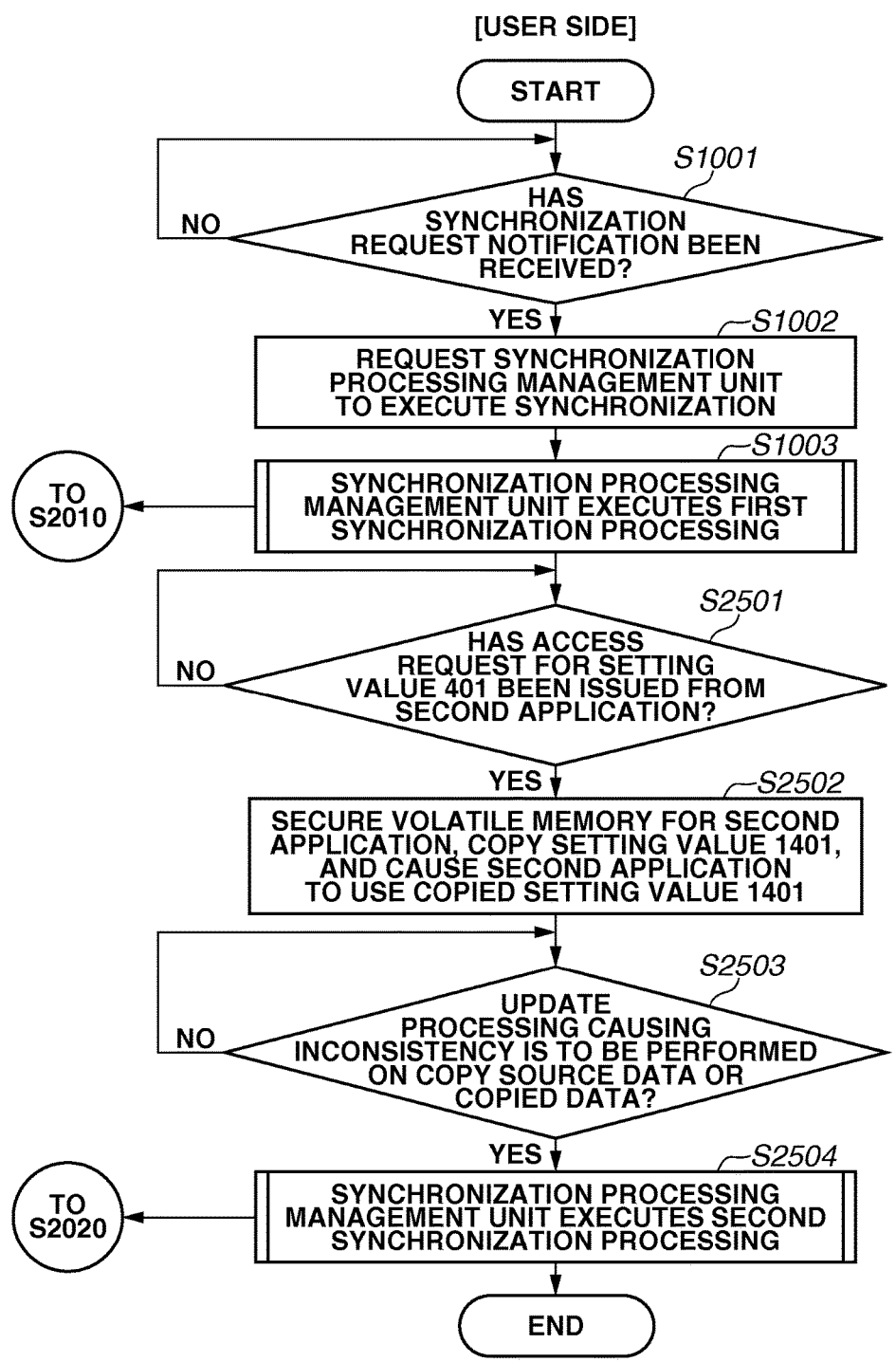

DATA SYNCHRONIZATION METHOD, DATA SYNCHRONIZATION APPARATUS, AND STORAGE MEDIUM FOR SYNCHRONIZING DATA AMONG A PLURALITY OF DATABASES

BACKGROUND OF THE INVENTION

Field of the Invention

The present invention relates to a method, an apparatus, and a storage medium for synchronizing data among a plurality of databases.

Description of the Related Art

Higher functionality of devices has been accompanied by the increased number of setting values, consequently requiring reduction of maintenance/management costs. Accordingly, there has been used a method for concentratedly managing the setting values in a master database (DB) on a network, and synchronizing the setting values from the master DB to an in-device DB by using a data synchronization technology. In the data synchronization technology, guaranteeing data consistency and improving data availability are in a trade-off relationship.

As a technology for controlling balance therebetween, for example, Japanese Patent Application Laid-Open No. 11-219309 discusses a method for improving data availability by performing different consistency management according to the type of transaction. Meanwhile, Japanese Unexamined Patent Application Publication No. 2009-541882 discusses a method for enhancing both safety and response performance by comparing and evaluating processing costs of storing data in a low-speed nonvolatile memory with the risk of losing data when data is stored only in a high-speed volatile memory so as to determine a storage destination.

There have been largely two tasks in concentrated management of setting values. One is to place top priority on securing response performance to a user currently using a device, and the other is to quickly reflect, on the device, a change of a setting value made in a master DB. Nevertheless, in the aforementioned conventional technologies, the granularity in controlling the data consistency and the data availability has been per transaction, providing poor flexibility in selection of data to be synchronized.

Thus, it has been difficult to improve performance by performing optimization of preferentially synchronizing only data referred to by a currently executed application. This constraint has been a problem particularly in a case where a behavior of an application currently used by a user must be controlled by quickly applying, to the device, a change of a setting value relating to security or user authority.

SUMMARY OF THE INVENTION

The present invention is directed to a data synchronization method capable of performing synchronization processing with priority placed on data referred to by an application currently being executed at a synchronization destination or data relating to a currently login user at the synchronization destination, a data synchronization apparatus, and a storage medium.

According to an aspect of the present invention, there is provided a data synchronization method for writing data having been subjected to transaction processing in a synchronization source database to a synchronization destination database. The method includes requesting, as synchronization target data, first data that is a part of the data having been subjected to the transaction processing from the synchronization source database, receiving at least the first data from the synchronization source database, preferentially performing first synchronization processing on the first data, and performing second synchronization processing on second data in the synchronization destination database, the second data having been processed in a same transaction as a transaction in which the first data has been processed in the synchronization source database.

Further features and aspects of the present invention will become apparent from the following detailed description of exemplary embodiments with reference to the attached drawings.

BRIEF DESCRIPTION OF THE DRAWINGS

FIGS. 3A and 3B respectively illustrate an access right data configuration of a multifunction peripheral side and an access right data configuration in a master DB, according to the first exemplary embodiment.

FIG. 4 illustrates access right data of the multifunction peripheral side (in a setting value DB) according to the first exemplary embodiment.

FIG. 5 illustrates access right data of the multifunction peripheral side (in a volatile memory) according to the first exemplary embodiment.

FIG. 6 illustrates access right data in the master DB according to the first exemplary embodiment.

FIG. 8 is a flowchart illustrating login processing according to the first exemplary embodiment.

FIG. 9 is a flowchart illustrating master DB update processing according to the first exemplary embodiment.

FIG. 10 is a flowchart illustrating data synchronization processing performed on the multifunction peripheral side according to the first exemplary embodiment.

FIG. 12 illustrates access right data in the master DB according to the first exemplary embodiment.

FIG. 13 illustrates a synchronization data acquisition request for the first synchronization processing according to the first exemplary embodiment.

FIGS. 14A and 14B respectively illustrate the access right data in the volatile memory and the setting value DB of the multifunction peripheral side, according to the first exemplary embodiment.

FIG. 15 illustrates a synchronization data acquisition request for the second synchronization processing according to the first exemplary embodiment.

FIGS. 16A and 16B respectively illustrate the access right data in the volatile memory and the setting value DB of the multifunction peripheral side, according to the first exemplary embodiment.

FIG. 17 is a flowchart illustrating synchronization processing performed on a master DB side according to the first exemplary embodiment.

FIG. 22 is a flowchart illustrating data synchronization processing performed on a multifunction peripheral side in a case 1 according to a second exemplary embodiment.

FIG. 23 is a flowchart illustrating data synchronization processing performed on the multifunction peripheral side in the case 1 according to the second exemplary embodiment.

FIG. 24 is a flowchart illustrating data synchronization processing performed on a multifunction peripheral side in a case 2 according to the second exemplary embodiment.

FIG. 25 is a flowchart illustrating data synchronization processing performed on the multifunction peripheral side in the case 2 according to the second exemplary embodiment.

DESCRIPTION OF THE EMBODIMENTS

Various exemplary embodiments, features, and aspects of the invention will be described in detail below with reference to the drawings.

A device setting value management system according to a first exemplary embodiment of the present invention will be described.

Figure 1:
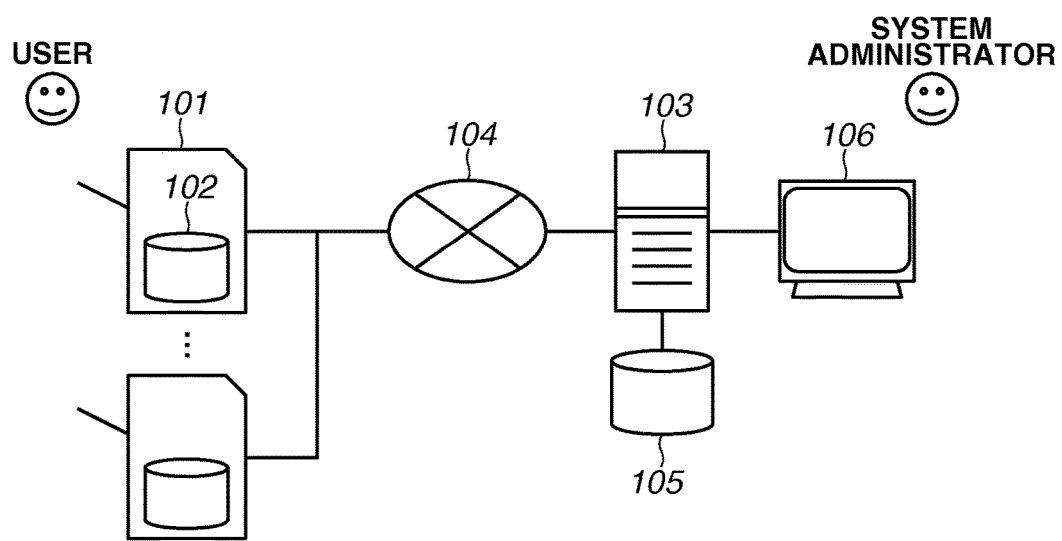
FIG. 1 is a diagram illustrating a configuration of a setting value management system according to a first exemplary embodiment.

FIG. 1 is a diagram illustrating a configuration of the system.

In the system, a multifunction peripheral 101 is a target device of setting value management. A device database (hereinafter, device DB) 102 is mounted on the multifunction peripheral 101 to store various types of setting value data such as print settings and user management information. A user can change the setting value data stored in the device DB 102 by using an application of the multifunction peripheral 101. A setting value management server 103, which is a server for concentratedly managing the setting values of the multifunction peripheral 101, includes a master database (hereinafter, master DB) 105, and is connected to a plurality of multifunction peripherals via a network 104.

The master DB 105 is a database for storing the setting values of all the multifunction peripherals being management targets in the system. In the system, the master DB 105 is set as a synchronization source database while the device DB 102 is set as a synchronization destination database. In other words, the setting values stored in the master DB 105 are delivered from the setting value management server 103 to each multifunction peripheral 101 to be stored in the device DB 102. An administrator terminal 106 is a terminal used by a system administrator to manage the setting values stored in the master DB 105.

Next, data synchronization processing performed in the system will be described in detail with reference to the drawings and flowcharts.

Figure 2:
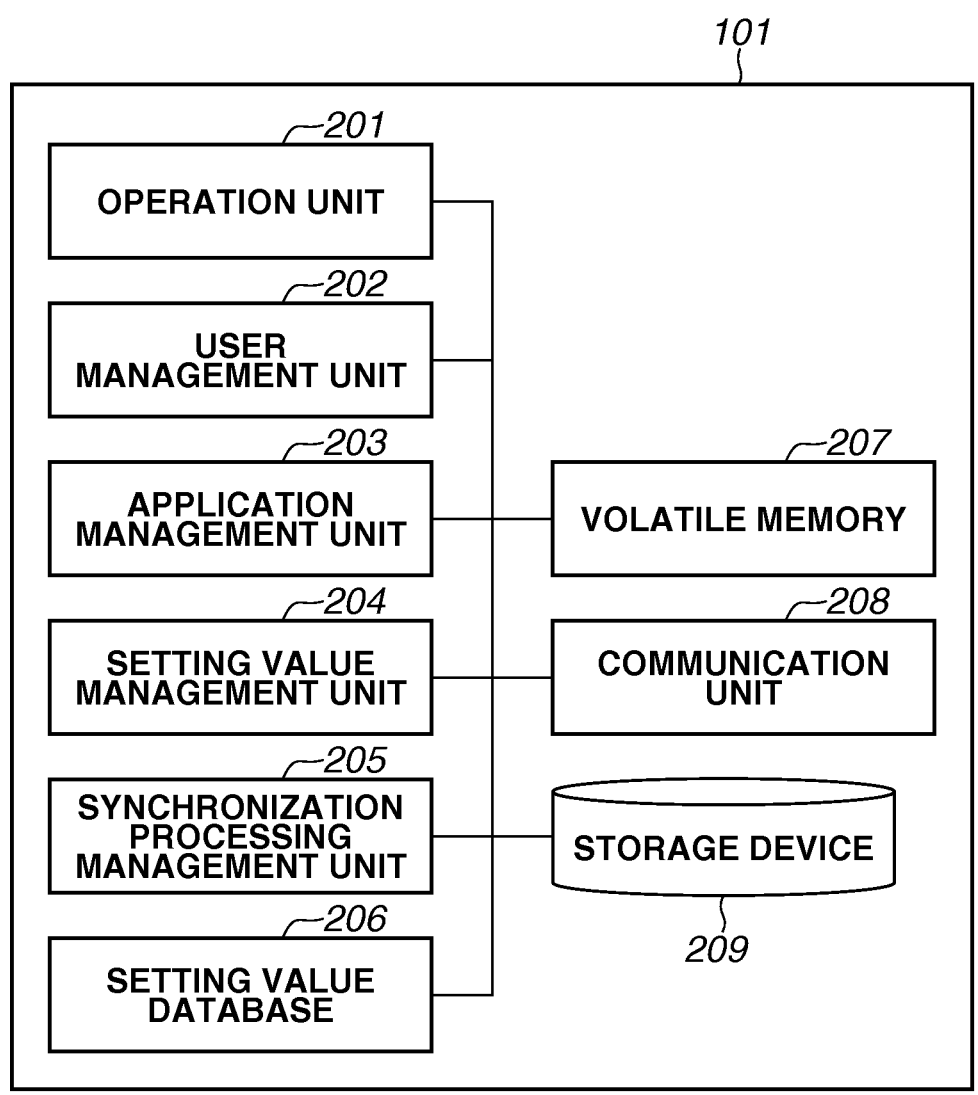
FIG. 2 is a diagram illustrating a module configuration of a multifunction peripheral according to the first exemplary embodiment.

FIG. 2 is a diagram illustrating a module configuration of the multifunction peripheral 101 used in the system. An operation unit 201 provides the user using the multifunction peripheral 101 with a user interface such as an operation panel or data display. A user management unit 202 manages the user who uses the multifunction peripheral 101 of the system. In the system, the user using the multifunction peripheral 101 performs login processing. An application management unit 203 is a module for controlling execution of applications loaded in the multifunction peripheral 101.

The examples of the applications include an application used by the user who has logged into the multifunction peripheral 101, and an application executed at the backend independently of the login user.

A setting value management unit 204 is a module for managing the setting values for controlling an operation of the multifunction peripheral 101. The setting value management unit 204 is connected to the application management unit 203 to provide the setting value to an application to be executed. In the present exemplary embodiment, for simpler description, only user's access right data is treated as a setting value. A synchronization processing management unit 205 is a module for executing data synchronization processing between the master DB 105 and a setting value database 206.

The synchronization processing management unit 205 is connected to the setting value management server 103 via a communication unit 208 to acquire the setting values from the master DB 105, and update setting value data stored in a volatile memory 207 and the setting value database 206.

The setting value database 206 is a database where the setting values of the multifunction peripheral 101 are registered. The volatile memory 207 is a cache memory for reading setting value data to be used by a currently executed application from the setting value database 206. A storage device 209 is a nonvolatile memory for storing the setting value database 206. In addition to the above-mentioned components, the multifunction peripheral 101 further includes modules for printing and scanning. The description of such modules will be, however, omitted because they do not directly relate to the present invention.

FIG. 3A illustrates a configuration table of the setting value data stored in the setting value database 206. As described above, in the present exemplary embodiment, for simpler description, only access right data will be described. A user identifier 301 is an identifier for the user logging into the multifunction peripheral 101. An application identifier 302 is an identifier for an application loaded in the multifunction peripheral 101. A user authority 303 is data for defining a user's execution authority for the application identified by the application identifier 302.

In the system, four execution authorities, that is, "Access Inhibited (0)", "General User (1)", "Privileged User (2)", and "Administrator (4)", are used. In the system, a case of controlling a user's execution authority for an application will be described as an example. However, possible implementing form of the present invention is not limited to this case.

FIG. 3B illustrates a configuration table of the setting value data stored in the master DB 105. As in the aforementioned case, for simpler description, only access right data will be described. A user identifier 311 is an identifier for the user registered in the system. An application identifier 312 is an identifier for an application loaded in the multifunction peripheral 101. A user authority 313 is data for defining a user's execution authority for the application identified by the application identifier 312. A transaction ID 314 is an identifier for identifying a transaction which has lastly updated the data.

FIG. 4 illustrates an example of the access right data stored in the setting value database 206. FIG. 4 illustrates a state where access right data for three users "User001" to "User 003" are registered.

FIG. 6 illustrates an example of the access right data stored in the master DB 105. FIG. 6 illustrates a state where access right data for three users are registered. The access right data illustrated in FIG. 6 are synchronized with the access right data in the setting value database 206 as illustrated in FIG. 4.

Figure 7A:
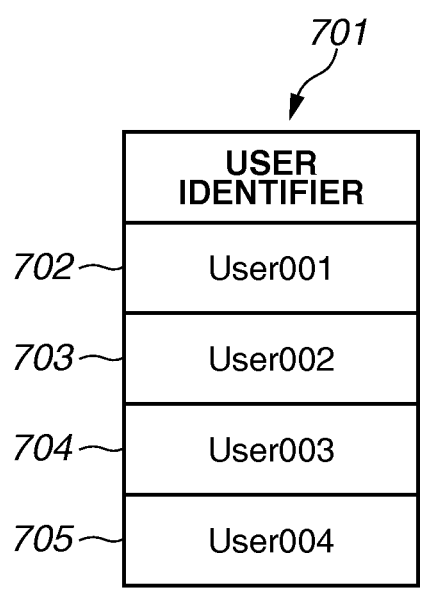
FIGS. 7A and 7B respectively illustrate user management data and device management data, according to the first exemplary embodiment.
Figure 7B:
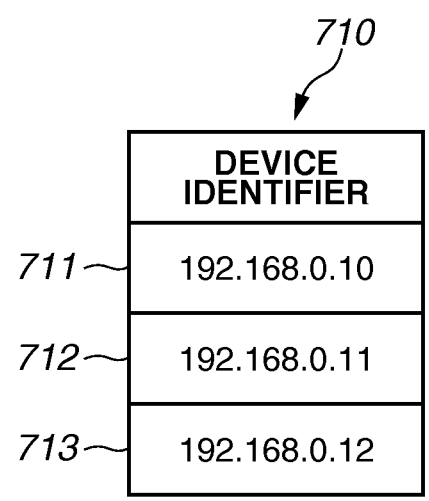

FIG. 7A illustrates a configuration of user management data 701 while FIG. 7B illustrates a configuration of device management data 710. FIGS. 7A and 7B respectively illustrate states where user identifiers 702 to 705 of all the users registered in the system and device identifiers 711 to 713 of all the multifunction peripherals registered in the system are registered. In the present exemplary embodiment, an Internet Protocol (IP) address is used for the device identifier. The same user management data 701 and the same device management data 710 are stored beforehand in the master DB 105 and the setting value database 206.

Figure 18:
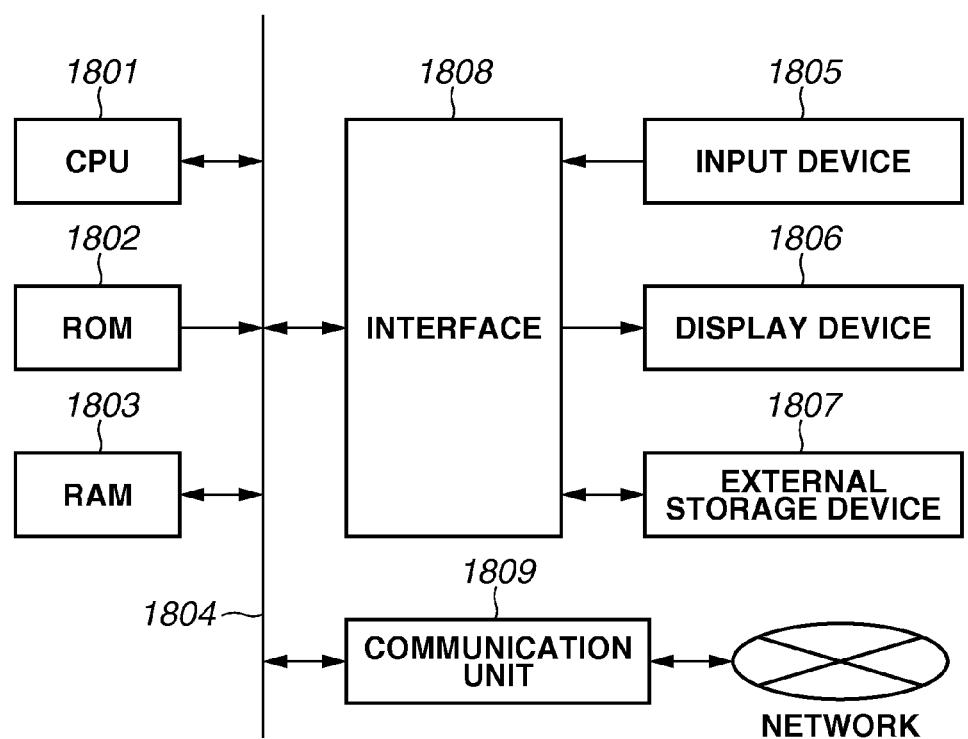
FIG. 18 is a diagram illustrating a configuration of a computer system used in a device setting value management system according to the present exemplary embodiment.

FIG. 18 is a diagram illustrating a configuration of a computer system used in the device setting value management system according to the present exemplary embodiment. A central processing unit (CPU) 1801 executes an operating system (OS) and various application programs to control respective units of the computer system. A read-only memory (ROM) 1802 stores fixed data among the programs executed by the CPU 1801 and calculation parameters. A random access memory (RAM) 1803 provides a work area and a temporary data storage area for the CPU 1801. The ROM 1802 and the RAM 1803 are connected to the CPU 1801 via a bus 1804.

An input device 1805 such as a keyboard, a display device 1806 such as a cathode-ray tube (CRT) or a liquid crystal display, and an external storage device 1807 such as a hard disk drive, a magnetooptical (MO) drive, or a compact disk (CD)-ROM drive are connected to the bus 1804 via an interface 1808. The bus 1804 is connected to a network via a communication unit 1809.

Next, the data synchronization processing according to the present exemplary embodiment will be described in detail with reference to drawings and flowcharts illustrated in FIGS. 8 to 17.

FIG. 8 is a flowchart illustrating processing performed from when the user logs into the multifunction peripheral 101 to when an application is activated. First, in step S801, when the user designates a user identifier (in this example, "User 001") via the operation unit 201 to execute login processing (YES in step S801), in step S802, the operation unit 201 requests the user management unit 202 to authenticate the designated user identifier. The user management unit 202 refers to the user identifiers 702 to 705 registered in the user management data 701.

In step S803, since the designated user identifier has been registered as the user identifier 702, the user's login is approved. After the approval of the login (YES in step S803), in step S804, the setting value management unit 204 loads a setting value relating to the login user into the volatile memory 207. The setting value management unit 204 searches the setting value database 206 by using the user identifier as a search condition, and acquires access right data (401 and 402) relating to the user to store the acquired data in the volatile memory 207.

FIG. 5 illustrates a state of the access right data stored in the volatile memory 207. Two access right data (501 and 502) corresponding to the "User 001" are stored.

Next, in step S805, when the user instructs activation of an application via the operation unit 201 (YES in step S805), in step S806, the operation unit 201 transfers an application identifier (in this example, "1001") designated by the user to the application management unit 203 to instruct activation of the application. In step S807, the application management unit 203 refers to the access right data stored in the volatile memory 207 to verify whether an execution authority for the application has been given to the user.

In this example, since the access right data 501 indicates that the authority of the administrator (4) for the application "1001" has been given to the user "User 001" (YES in step S807), in step S808, the application management unit 203 activates the designated application. Thereafter, each time the user operates an application, an execution authority for the operated application will be verified by referring to the access right data 501. The user "User 001" is permitted to execute an arbitrary application because the authority of the administrator (4) has been given.

The login and application activation processing has been described above.

Next, setting value changing processing for the master DB 105 will be described.

FIG. 9 is a flowchart illustrating the setting value changing processing for the master DB 105.

As an example, a case where execution authorities of all the users for the application "1001" are changed to a general user (1) will be described. First, in step S901, the system administrator connects to the master DB 105 via the administrator terminal 106 to instruct change of the setting value data. If the change instruction has been received (YES in step S901), in step S902, a transaction ID is issued from the master DB 105. In step S903, an update transaction is started in the master DB 105. The administrator terminal 106 searches the master DB 105 by using the application identifier ("1001") as a search condition to identify data (601, 603, and 606) matching the search condition, and a value of the user authority 313 of each of the identified data is set to "1".

In step S904, the transaction ID (in this example, "11") issued in step S902 is set in the transaction ID 314, and then, the master DB 105 is updated. After all the data has been updated, in step S905, the transaction is committed to end the transaction.

FIG. 12 illustrates a state of the updated access right data in the master DB 105. User authorities and transaction IDs of data 1201, 1203, and 1206 corresponding to the application "1001" have been changed.

After the completion of the update processing of the master DB 105, the setting value management server 103 notifies all the devices of the update of the setting value data. First, in step S906, the device identifiers 711 to 713 registered in the device management data 710 are acquired. Next, in step S907, the setting value management server 103 is connected to the communication unit 208 of the multifunction peripheral 101 indicated by each of the IP addresses of the acquired device identifiers, via the network 104 to transmit a synchronization request notification. The transaction ID issued in step S902 is transmitted through the synchronization request notification.

The setting value changing processing for the master DB 105 has been described above.

Figure 11:
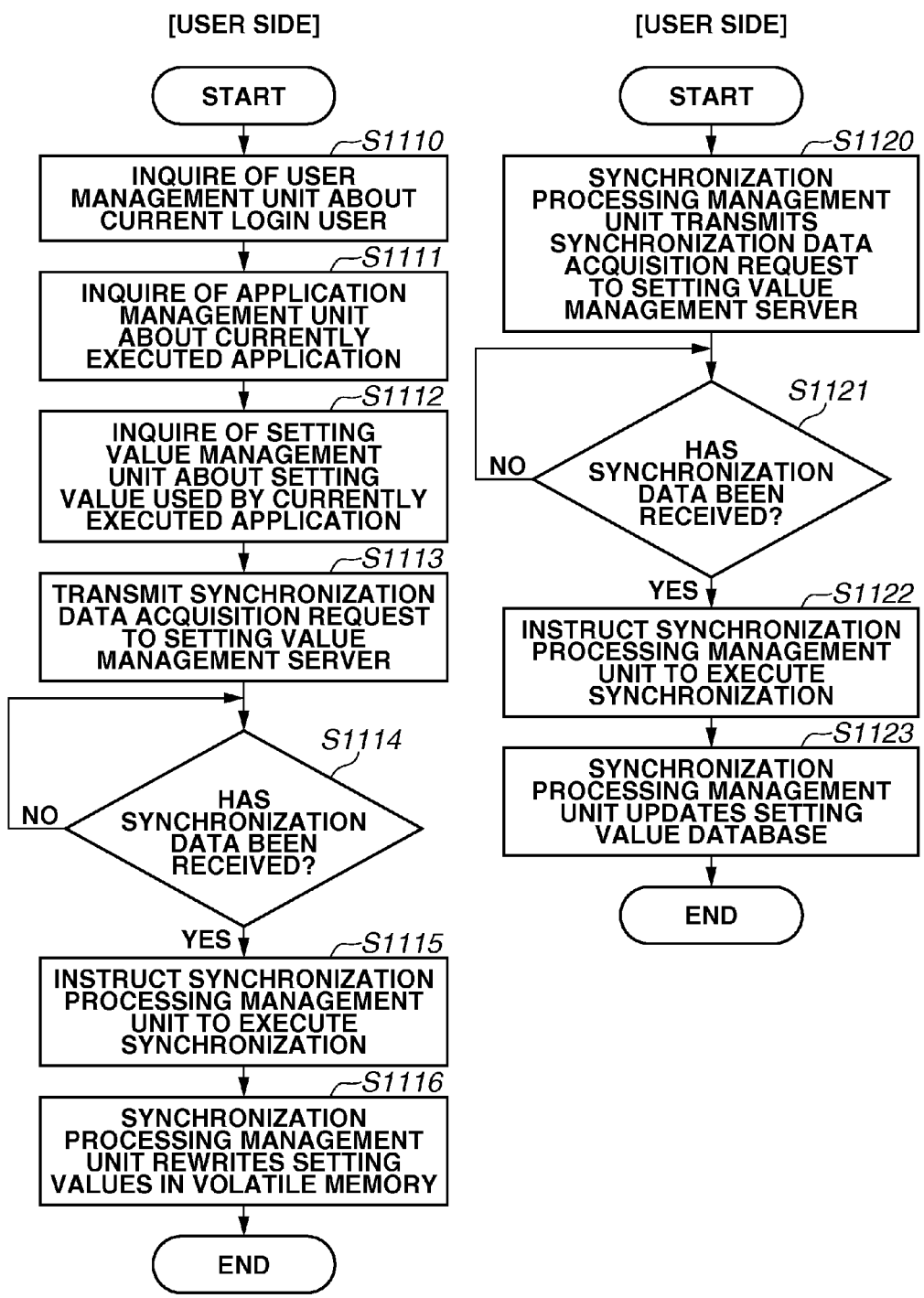
FIG. 11 illustrates flowcharts respectively indicating first data synchronization processing and second data synchronization processing, performed on the multifunction peripheral side according to the first exemplary embodiment.

Next, the data synchronization processing performed on the multifunction peripheral 101 side will be described with reference to flowcharts illustrated in FIGS. 10 and 11.

In step S1001, the communication unit 208 receives the synchronization request notification from the setting value management server 103. If the synchronization request notification has been received (YES in step S1001), in step S1002, the communication unit 208 requests the synchronization processing management unit 205 to perform synchronization. In step S1003, the synchronization processing management unit 205 that has received the request initially performs first synchronization processing for synchronizing the setting values stored in the volatile memory 207.

In step S1110, the user management unit 202 is inquired of about a login user. In this example, the user "User 001" is currently in a login state. Then, in step S1111, the application management unit 203 is inquired of about a currently executed application. In this example, the application "1001" is currently executed.

Next, in step S1112, the setting value management unit 204 is inquired of about a setting value currently used by the application "1001". In this example, the access right data 501 is currently stored in the volatile memory 207 and is being used. After the acquisition of the above-described information, in step S1113, the synchronization processing management unit 205 transmits a synchronization data acquisition request to the setting value management server 103 via the communication unit 208.

FIG. 13 illustrates a data configuration of the synchronization data acquisition request. To designate synchronization target data, a transaction ID 1301, an application identifier 1302, and a user identifier 1303 received in the synchronization request notification are included. Processing performed in the setting value management server 103 that has received the synchronization data acquisition request will be described below, so the description of the processing is not given here. The description of the processing performed in the multifunction peripheral 101 is now continued. In step S1114, the communication unit 208 receives synchronization data from the setting value management server 103 as a response to the synchronization data acquisition request.

In this example, among the updated setting value data illustrated in FIG. 12, the data 1201 corresponding to the identifiers ("User 001" and "1001) designated by the synchronization data acquisition request is received. After the reception of the synchronization data (YES in step S1114), in step S1115, the data is transferred to the synchronization processing management unit 205 to instruct execution of synchronization. In step S1116, the synchronization processing management unit 205 rewrites the data in the volatile memory 207 by using the acquired synchronization data. In this example, among the access right data stored into the volatile memory 207 in step S804 of the flowchart in FIG. 8, only the access right data 501 corresponding to the application "1001" is rewritten with a content of the synchronization data.

FIG. 14A illustrates a state of the access right data stored in the volatile memory 207 after the execution of the first synchronization processing. FIG. 14B illustrates a state of the access right data stored in the setting value database 206 after the execution of the first synchronization processing.

In the access right data in the volatile memory 207, the user authority for the application "1001" has been changed to "1" by the synchronization processing (access right data 1401). On the other hand, none of the access right data in the setting value database 206 has been changed from the state before the synchronization processing.

In this state, when the user operates the application, the access right data 1401 is referred to, so that only an operation permitted to the user authority (1) is executable. In other words, the setting value update in the master DB 105 has been reflected on the user's application operation.

After the completion of the first synchronization processing, in step S1004, the second synchronization processing is subsequently executed. In step S1120, the synchronization processing management unit 205 transmits a synchronization data acquisition request to the setting value management server 103 to acquire all synchronization data.

FIG. 15 illustrates a data configuration of the synchronization data acquisition request. A transaction ID 1501 is equal in value to that during the first synchronization processing. All the other items are set blank so as to request acquisition of all data updated in the same transaction identified by the transaction ID. In step S1121, as in the case of the first synchronization processing, the communication unit 208 receives synchronization data from the setting value management server 103 as a response to the synchronization data acquisition request. If the synchronization data has been received (YES in step S1121), in step S1222, the communication unit 208 transfers the synchronization data to the synchronization processing management unit 205 to instruct execution of synchronization. Then, in step S1123, the synchronization processing management unit 205 updates the data in the setting value database 206 by using the synchronization data.

FIGS. 16A and 16B illustrate states of the access right data after the execution of the second synchronization processing. At this stage, consistency is maintained among the access right data in the master DB 105 (FIG. 12), the access right data in the volatile memory 207 (FIG. 16A), and the access right data in the setting value database 206 (FIG. 16B).

The synchronization processing performed on the multifunction peripheral 101 side has been described above.

Next, referring to a flowchart illustrated in FIG. 17, synchronization data transmission processing performed on the setting value management server 103 side will be described.

In step S1701, the setting value management server 103 receives the synchronization data acquisition request transmitted in steps S1113 and S1120. If the synchronization data acquisition request has been received (YES in step S1701), in step S1702, the setting value management server 103 extracts the transaction ID 1301 from the synchronization data acquisition request. Then, in step S1703, the setting value management server 103 searches the master DB 105 by using the transaction ID as a search condition to acquire all the data updated in the transaction. In this example, three data 1201, 1203, and 1206 illustrated in FIG. 12 are acquired.

In step S1704, the setting value management server 103 extracts the application identifier and the user identifier from the synchronization data acquisition request. When values of these two identifies have been designated (YES in step S1705), in step S1706, among the data acquired in step S1703, data matching the designation is extracted. In step S1707, the extracted data is transmitted to the multifunction peripheral 101 by the same procedures as those of steps S906 and S907 of the flowchart in FIG. 9. On the other hand, when the values are not designated (NO in step S1705), in step S1708, in order to transmit all the updated data in the transaction, all the data acquired in step S1703 are extracted. In step S1707, the extracted data are similarly transmitted to the multifunction peripheral 101.

The synchronization data transmission processing performed on the setting value management server 103 side has been described above.

Figure 19:
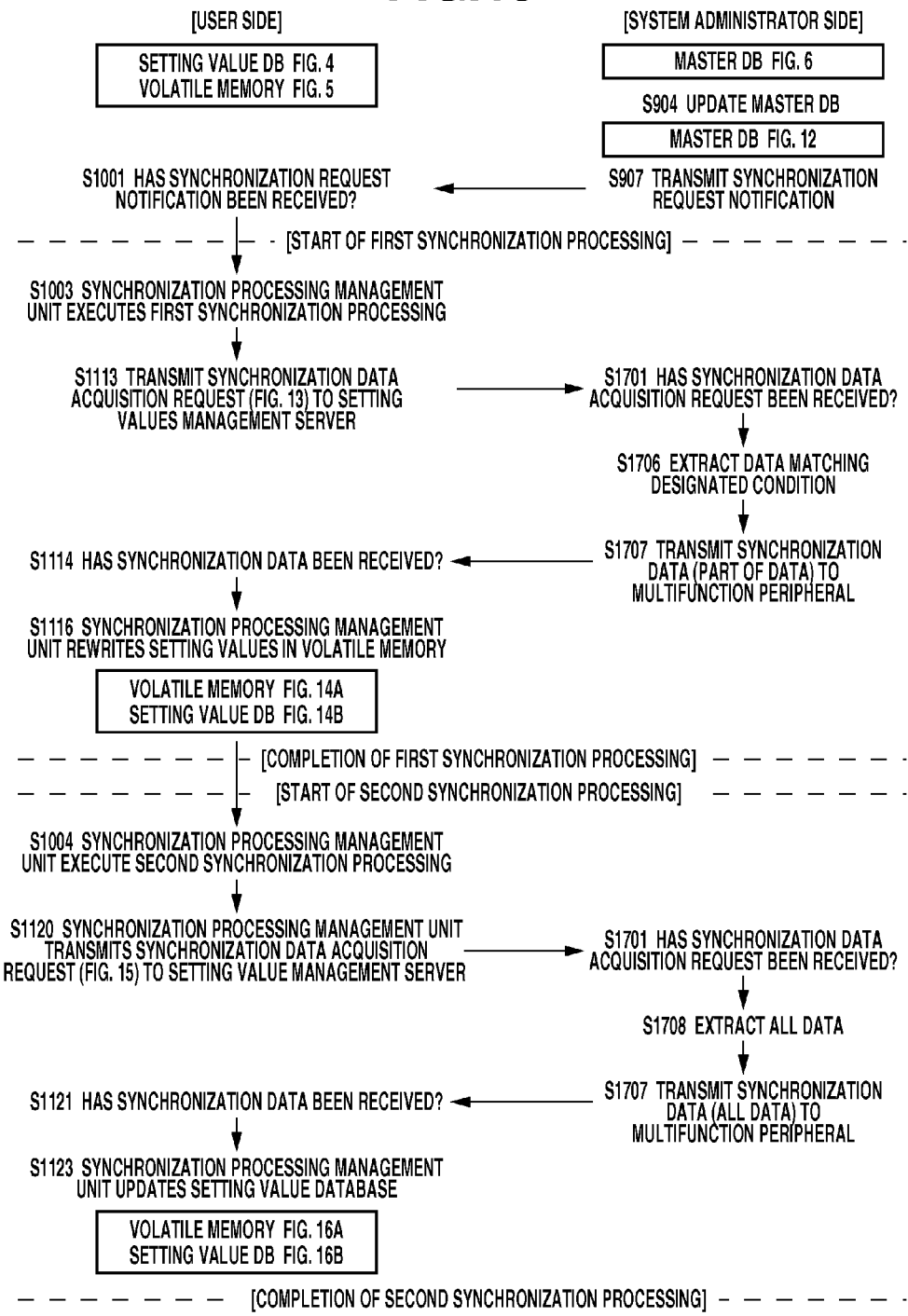
FIG. 19 is a diagram illustrating an overall image of processing flows on the multifunction peripheral side and the master DB side, and data transition according to the first exemplary embodiment.

FIG. 19 illustrate, while organizing the foregoing description, an overall image of processing flows performed on the multifunction peripheral 101 side and the master DB 105 side and data transition, according to the first exemplary embodiment.

In the foregoing description, all the data updated in the master DB 105 are acquired when the second synchronization processing is executed.

However, all the data relating to the same transaction updated in the master DB 105 may be acquired when the first synchronization processing is executed, all the acquired data may be stored in the storage device 209, and the stored data may be used when the second synchronization processing is executed.

Figure 20:
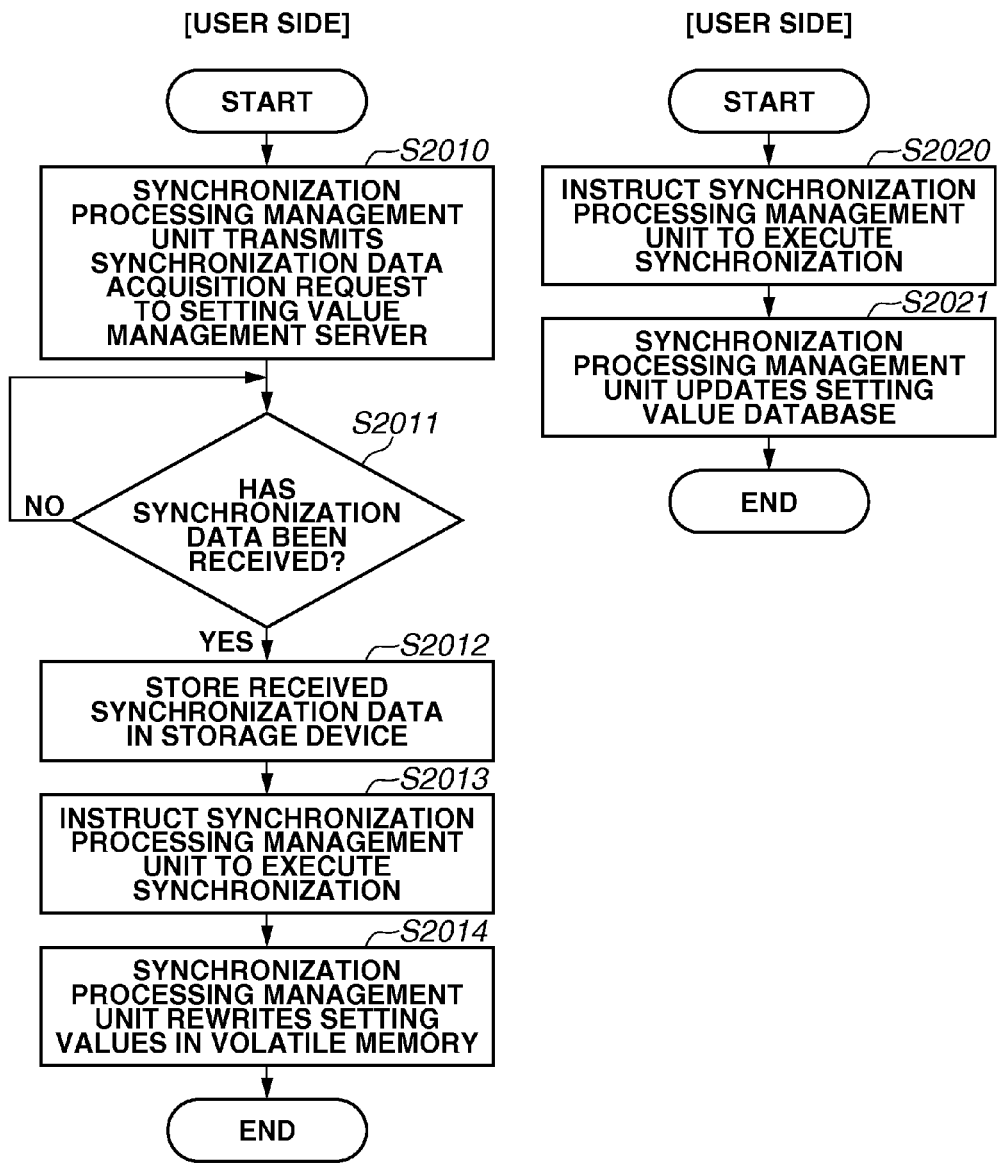
FIG. 20 illustrates flowcharts respectively indicating the first data synchronization processing and the second data synchronization processing, performed on the multifunction peripheral side according to the first exemplary embodiment.

FIG. 20 illustrates flowcharts respectively indicating the first data synchronization processing and the second data synchronization processing, performed on the multifunction peripheral 101 side (user side) in this case.

Figure 21:
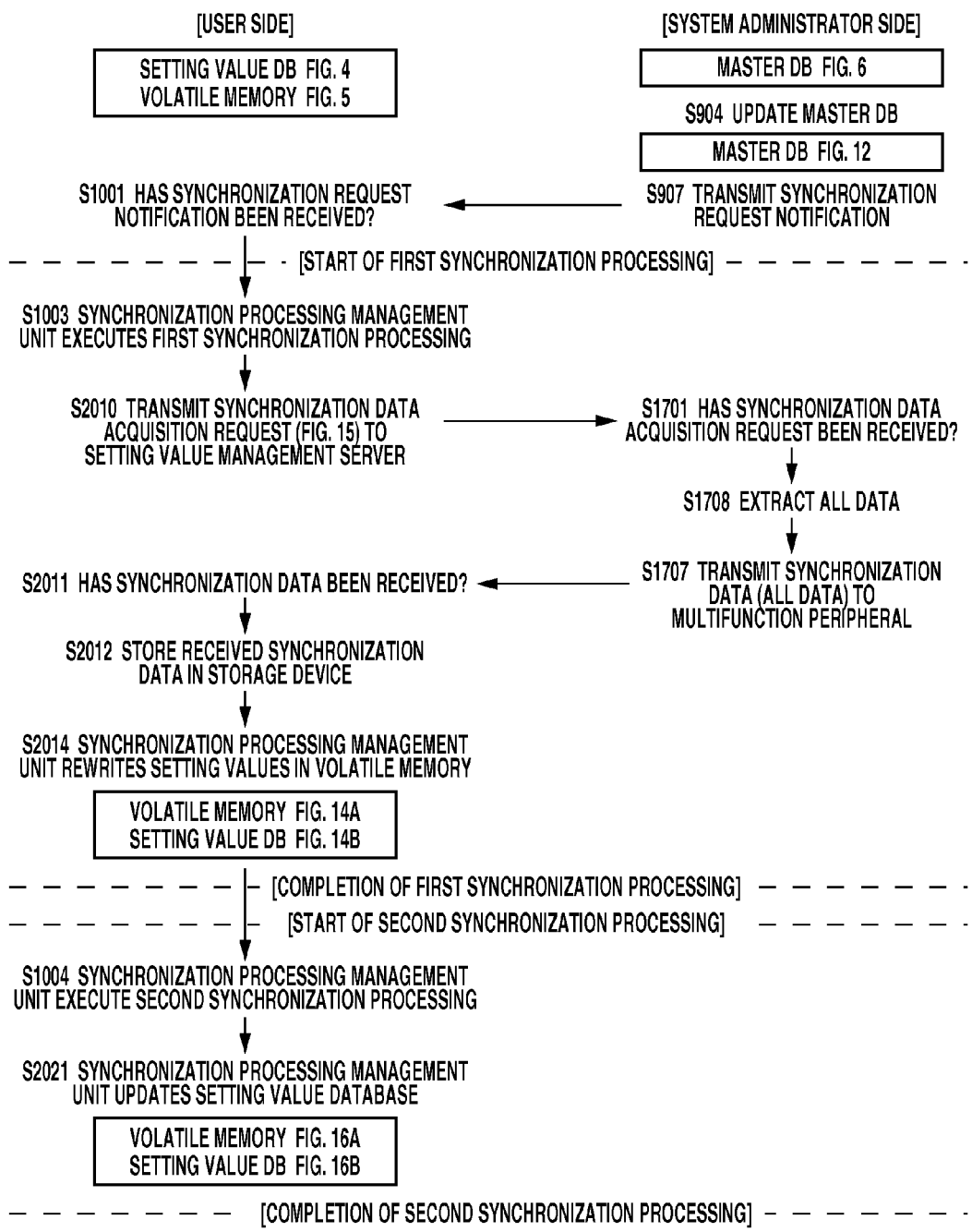
FIG. 21 is a diagram illustrating an overall image of processing flows on the multifunction peripheral side and the master DB side, and data transition according to the first exemplary embodiment.

FIG. 21 schematically illustrates processing flows in the entire system and data transition in this case.

By reusing the data acquired during the execution of the first synchronization processing, when the second synchronization processing is executed, reacquisition of data can be omitted (reaccess to the setting value management server 103 can be omitted).

In the foregoing description, the second synchronization processing is subsequently executed after the execution of the first synchronization processing. However, the timing of executing the second synchronization processing is not limited to this form. For example, the present invention can be implemented by a form of delaying the execution until an instruction is received from the application or a form of executing the second synchronization processing in parallel with the first synchronization processing.

The case where the setting value which is the target of the second synchronization processing is not stored in the volatile memory 207 has been described above. When the setting value which is the target of the second synchronization processing is stored in the volatile memory 207, needless to say, the setting value in the volatile memory 207 is subjected to synchronization processing during the second synchronization processing.

The device setting value management system according to the first exemplary embodiment has been described above.

As described above, the device setting value management system according to the present exemplary embodiment can achieve both responsivity to the user and data consistency by using the first synchronization processing for synchronizing the setting values in the volatile memory 207 and the second synchronization processing for synchronizing the setting values in the database. More specifically, deterioration of response performance can be suppressed by synchronizing only the setting values currently being used in the volatile memory 207 at high speed so as to prevent interference with the user's application operation for synchronization processing. In addition, data consistency between the master DB 105 and the device DB 102 can be ensured by performing the second synchronization processing. Thus, safety during data use can be improved.

Next, a second exemplary embodiment will be described.

The present exemplary embodiment is directed to units for preventing a data inconsistent state that may occur after the execution of the first synchronization processing in the first exemplary embodiment.

As described above in the first exemplary embodiment, the timing of executing the second synchronization processing is arbitrary in the present invention. Thus, the state where only the first synchronization processing is executed (state of setting values illustrated in FIGS. 14A and 14B) is permitted. When the setting value of the multifunction peripheral 101 side is updated in this state (in the state where synchronization processing for the setting value DB 206 is yet to be executed while synchronization processing for the volatile memory 207 has been executed), an inconsistent state is caused.

An exemplary embodiment that includes the unit for preventing an inconsistent state will be described. In the description of the present exemplary embodiment, the states illustrated in FIGS. 14A and 14B are assumed to be initial states of setting values on the multifunction peripheral 101 side.

A case 1 is a case where an application currently executed in the multifunction peripheral 101 updates the synchronized setting value 1401 in the volatile memory 207.

In this case, only a part of the setting values (1201, 1203, and 1206) which have been subjected to transaction processing on the master DB 105 side are updated on the multifunction peripheral 101 side. Accordingly, transaction consistency of data is not maintained. To maintain the transaction consistency, setting values 403 and 406 of the multifunction peripheral 101 side respectively corresponding to the setting values 1203 and 1206 must be synchronized. Thus, in step S2201 of the flowchart illustrated in FIG. 22, a synchronization processing management unit 205 according to the present exemplary embodiment monitors an update request for the setting value 1401 when the states illustrated in FIGS. 14A and 14B are caused. If the update request is issued (YES in step S2201), in step S2202, the second synchronization processing is immediately executed. After the transaction consistency of the setting values 403, 406, and 1401 has been guaranteed (after completion of the second synchronization processing), in step S2203, updating of the setting value 1401 is executed. Through this procedure, the transaction consistency is maintained.

In step S2301 of the flowchart illustrated in FIG. 23, a synchronization processing management unit 205 according to another exemplary embodiment for the case 1 monitors an update request for the setting value 1401 when the states illustrated in FIGS. 14A and 14B are caused. If the update request for the setting value 1401 is issued (YES in step S2301), in step S2302, the synchronization processing management unit 205 immediately executes updating. In step S2303, after the setting value 1401 has been updated, the synchronization processing management unit 205 starts monitoring an access request for the setting values 403 and 406.

If an arbitrary application in the multifunction peripheral 101 has issued the access request for the setting values 403 or 406 (YES in step S2303), in step S2304, the synchronization processing management unit 205 immediately executes the second synchronization processing. After completion of the second synchronization processing, in step S2305, the synchronization processing management unit 205 permits access to the setting value synchronized in the setting value DB 206. Thus, the transaction consistency is maintained.

According to the present exemplary embodiment, there is no need to execute the second synchronization processing until the transaction consistency cannot be maintained any more. In addition, the currently executed application can update the setting value in the volatile memory 207. Thus, the present exemplary embodiment provides an effect of improving data availability.

To carry out the above procedures, the multifunction peripheral 101 according to the present exemplary embodiment includes, in addition to the module configuration illustrated in FIG. 2, an acquisition unit configured to acquire a list of series of setting values having been subjected to transaction processing on the master DB 105 side, and an identification unit configured to identify setting values included in the list in the setting value database 206. As described above, the synchronization processing management unit 205 monitors an update request or an access request for any of the setting values identified by the identification unit, and executes the second synchronization processing when such requests are issued.

A case 2 is a case where another application executed in the multifunction peripheral 101 accesses a not-synchronized setting value 401 in the setting value database 206.

In this case, inconsistency occurs in value of setting values to be referred to with the application that uses the synchronized setting value 1401 in the volatile memory 207. To solve the state, in step S2401 of the flowchart in FIG. 24, a synchronization processing management unit 205 according to the present exemplary embodiment monitors an access request for the setting value 1401 when the states illustrated in FIGS. 14A and 14B are caused. If the update request is issued (YES in step S2401), in step S2402, the second synchronization processing is immediately executed.

Thus, data inconsistency between the setting values in the volatile memory 207 and the setting value database 206 is resolved, and inconsistency caused when using different setting values among a plurality of applications can be prevented.

In step S2501 of the flowchart in FIG. 25, a synchronization processing management unit 205 according to another exemplary embodiment for the case 2 monitors an access request for the setting value 401 from another application (a second application).

The setting value 401 is data to be synchronized during the second synchronization processing and corresponding to data (the setting value 1201) synchronized during the first synchronization processing.

If the access request for the setting value 401 has been issued from the second application (YES in step S2501), in step S2502, the synchronization processing management unit 205 secures the volatile memory 207 for the second application, and copies the setting value 1401 thereinto, so as to cause the second application to access the copied setting value 1401.

Then, in step S2503, the synchronization processing management unit 205 monitors whether update processing causing inconsistency is to be performed for the setting value 1401 (may also be referred to as "copy source data") or the copied data. When the update processing causing inconsistency is to be performed (YES in step S2503), in step S2504, the second synchronization processing is performed.

As a result, the execution of the second synchronization processing is suppressed, thereby improving response performance. In addition, there is no need to partially update the setting value database 206 because the setting value in the volatile memory 207 is copied to be used again, so that transaction consistency is maintained.

To carry out the above procedures, the multifunction peripheral 101 according to the present exemplary embodiment includes, in addition to the module configuration illustrated in FIG. 2, an acquisition unit configured to acquire a list, an identification unit configured to identify setting values included in the list in the setting value database 206, and a copying unit configured to copy the setting value in the volatile memory 207. The acquisition unit configured to acquire the list acquires a list of a series of setting values having been subjected to transaction processing on the master DB 105 side.

A case 3 is a case where another application executed in the multifunction peripheral 101 accesses the setting value 403 or 406 which is not synchronized in the setting value database 206. These setting values and the setting value 1401 synchronized in the volatile memory 207 have been subjected to transaction processing in the master DB 105. Accordingly, from the standpoint of transaction consistency, a state where an application using a setting value after synchronization and an application using a setting value before synchronization are mixed must be prevented.

To solve the state, in step S2401 of the flowchart in step FIG. 24, a synchronization processing management unit 205 according to the present exemplary embodiment monitors an access request for a setting value (a setting value in the setting value database 206) to be processed in the same transaction as the transaction in which the setting value has been updated during the first synchronization processing. If the access request has been issued (YES in step S2401), in step S2402, the second synchronization processing is immediately executed.

As a result, inconsistency caused by referring to setting values having different transaction completion states among a plurality of applications can be prevented.

To carry out the above procedures, the multifunction peripheral 101 according to the present exemplary embodiment includes, in addition to the module configuration illustrated in FIG. 2, an acquisition unit configured to acquire a list of a series of setting values having been subjected to transaction processing on the master DB 105 side, and an identification unit configured to identify setting values included in the list in the setting value database 206.

Next, a third exemplary embodiment will be described.

The foregoing exemplary embodiments have been directed to the case of performing the data synchronization processing in a state where the setting values are stored in the setting value database 206 of the multifunction peripheral 101.

The present exemplary embodiments is directed to a case of performing data synchronization processing in a state where setting values are not stored on the multifunction peripheral 101 side. A module configuration of the present exemplary embodiment is basically similar to that of the first exemplary embodiment, and thus description thereof will be omitted.

A data synchronization processing procedure according to the present exemplary embodiment will be described.

First, according to the same procedures as those of steps S801 to S803, a user logs into the multifunction peripheral 101. Then, the setting value management unit 204 searches the setting value database 206 for a user's setting value. Because setting values are assumed to be not stored in the present exemplary embodiment, no setting value is acquired in the searching. When no setting value is acquired, the setting value management unit 204 requests the synchronization processing management unit 205 to execute the first synchronization processing. The synchronization processing management unit 205 transmits a synchronization data acquisition request to the setting value management server 103. In this example, only the user identifier 1303 is stored in a data configuration of the synchronization data acquisition request.

As a result, setting values relating to the designated user are acquired all at once. Then, the synchronization processing management unit 205, which has acquired synchronization data from the setting value management server 103, loads the setting value into the volatile memory 207 by the same procedure as that of step S804. A procedure thereafter is similar to that in the first exemplary embodiment, and thus description thereof will be omitted.

As described above, the setting value management system according to the present exemplary embodiment can quickly enable the user's setting value by executing the first synchronization processing when no setting value is stored in the multifunction peripheral 101. The present exemplary embodiment is particularly effective when applied to, for example, a case of acquiring, from the master DB 105, a setting value of a user logging into the multifunction peripheral 101 for the first time.

Next, a fourth exemplary embodiment will be described.

The first exemplary embodiment has been directed to the case of performing the first synchronization processing after the reception of the synchronization request notification from the setting value management server 103.

In the present exemplary embodiment, the first synchronization processing is activated from the multifunction peripheral 101 side. A module configuration of the present exemplary embodiment is basically similar to that of the first exemplary embodiment, and thus description thereof will be omitted.

A data synchronization processing procedure according to the present exemplary embodiment will be described.

First, according to the same procedures as those of steps S801 to S808, a user logs into the multifunction peripheral 101 to store a setting value in the volatile memory 207, and activates an application.

Then, the synchronization processing management unit 205 of the multifunction peripheral 101 executes the first synchronization processing. In other words, a synchronization data acquisition request is transmitted to the setting value management server 103. A data configuration of the synchronization data acquisition request in this example includes the application identifier 1302 and the user identifier 1303. As a result, a latest-state setting value relating to the application and being stored in the master DB 105 is acquired. Processing after the acquisition of the synchronization data is similar to that in the first exemplary embodiment, and thus description thereof will be omitted.

Timing of executing the synchronization processing according to the present exemplary embodiment may be immediately after step S804 before the application is activated. In this case, a data configuration of the synchronization data acquisition request includes only the user identifier 1303, and latest-state setting values relating to the user and being stored in the master DB 105 are acquired all at once.

The present exemplary embodiment is effective when applied to a system which performs synchronization with the master DB 105 at the time of login. Since the setting value stored in the multifunction peripheral 101 is used so as to quickly perform login processing, the present exemplary embodiment is particularly effective for improving response performance of the login processing in an environment where there are issues concerning performance and stability of a communication environment.

Next, a fifth exemplary embodiment will be described.

The present exemplary embodiment is directed to exclusive control of the setting value database 206.

The aforementioned exemplary embodiments have been directed to the method of initially executing the first synchronization processing, whereas in the present exemplary embodiment, the second synchronization processing is executed first because priority is placed on guaranteeing data consistency. In the execution of the second synchronization processing, when a setting value stored in the setting value database 206 is under exclusive control by an application and cannot be updated, a synchronization processing management unit 205 according to the present exemplary embodiment stores the setting value in the volatile memory 207, and does not update the setting value database 206. After the exclusive control by the application has been canceled, the synchronization processing management unit 205 updates the setting value database 206 by using the setting value in the volatile memory 207.

The object of the present invention can also be achieved by supplying software program codes for realizing the functions of the above exemplary embodiments to a system or an apparatus, and a computer (CPU or micro processing unit (MPU)) of the system or the apparatus reading and executing the program codes. In this case, the program codes themselves read from a storage medium realize the functions of the above exemplary embodiments, and the storage medium storing the program codes constitutes the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

High-speed data synchronization processing is performed only on data referred to by a currently executed application and data relating to a login user, and then data synchronization processing for guaranteeing data consistency is performed. As a result, response performance to the user can be ensured while maintaining data consistency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-207069 filed Oct. 2, 2013, which is hereby incorporated by reference herein in its entirety.

What is claimed is:

1. A data synchronization method for writing data having been subjected to transaction processing in a synchronization source database to a synchronization destination database, the method comprising:

requesting by a synchronization processing management unit, as synchronization target data, first data that is a part of the data having been subjected to the transaction processing from the synchronization source database;
receiving by the synchronization processing management unit at least the first data from the synchronization source database;
performing first synchronization processing in a cache memory corresponding to the synchronization destination database on the first data preferentially to a second data that is different from the first data in the data having been subjected to the transaction processing in which the first data has been processed in the synchronization source database, and not performing any synchronization processing on the first data in the synchronization destination database; and
performing second synchronization processing on all data in the synchronization destination database after performing the first synchronization processing, the all data having been processed in same transaction as the transaction in which the first data has been processed in the synchronization source database.

2. The data synchronization method according to claim 1, further comprising:
requesting, as synchronization destination data, the first data and the second data from the synchronization source database, in the requesting;
receiving the first data and the second data from the synchronization source database, in the receiving; and
storing, after the receiving, the second data into a storage unit of the synchronization destination database before the first synchronization processing,
wherein the second synchronization processing is performed on the second data stored in the storage unit in the storing.

3. The data synchronization method according to claim 1, wherein data stored in a volatile memory is synchronized in the first synchronization processing, and
wherein data stored in a nonvolatile memory is synchronized in the second synchronization processing.

4. The data synchronization method according to claim 1, further comprising performing first monitoring for monitoring an update request for data synchronized in the first synchronization processing, after the first synchronization processing, in the cache memory has been solely performed in the synchronization destination database,
wherein the second synchronization processing is performed immediately after the update request for the data synchronized in the first synchronization processing has been issued.

5. The data synchronization method according to claim 1, further comprising performing second monitoring for monitoring an access request for data to be synchronized in the second synchronization processing, after the first synchronization processing has been solely performed in the synchronization destination database,
wherein the second synchronization processing is performed immediately after the access request for the data to be synchronized in the second synchronization processing has been issued.

6. The data synchronization method according to claim 1, further comprising:
performing third monitoring for monitoring an access request from a second application for data to be synchronized in the second synchronization processing and corresponding to the data synchronized in the first synchronization processing, after the first synchronization processing has been solely performed in the synchronization destination database;
securing, immediately after the access request has been issued in the third monitoring, a cache memory for the second application to copy the data synchronized in the first synchronization processing, and causing the second application to access the copied data; and
monitoring whether update processing causing inconsistency in copy source data or copied data is to be performed, and performing the second synchronization processing when the update processing causing inconsistency is to be performed.

7. The data synchronization method according to claim 1, wherein the first data is data relating to a user currently using a device that includes the synchronization destination database.

8. The data synchronization method according to claim 1, wherein the first data is data relating to an application currently being executed in a device that includes the synchronization destination database.

9. The data synchronization method according to claim 1, wherein the data is user's access right data for an application.

10. A data synchronization apparatus configured to receive data having been subjected to transaction processing in a synchronization source database and write the data to a synchronization destination database, the data synchronization apparatus comprising:
one or more processors; and
at least one memory storing a program which, when executed by the one or more processors, causes the data synchronization apparatus to function as:
a synchronization processing management unit configured to request, as synchronization target data, first data that is a part of the data having been subjected to the transaction processing from the synchronization source database,
wherein the synchronization processing management unit is configured to:
receive at least the first data from the synchronization source database;
performing first synchronization processing in a cache memory corresponding to the synchronization destination database on the first data preferentially to a second data that is different from the first data in the data having been subjected to the transaction processing in which the first data has been processed in the synchronization source database, and not performing any synchronization processing on the first data in the synchronization destination database; and
perform second synchronization processing on all data in the synchronization destination database after performing the first synchronization processing, the all data having been processed in same transaction as the transaction in which the first data has been processed in the synchronization source database.

11. A non-transitory computer-readable storage medium storing a computer program for writing data that having been subjected to transaction processing in a synchronization source database to a synchronization destination database, the computer program comprising code for performing the steps of:
requesting by a synchronization processing management unit, as synchronization target data, first data that is a part of the data having been subjected to the transaction processing from the synchronization source database;
receiving by the synchronization processing management unit at least the first data from the synchronization source database;

performing first synchronization processing in a cache memory corresponding to the synchronization destination database on the first data preferentially to a second data that is different from the first data in the data having been subjected to the transaction processing in which the first data has been processed in the synchronization source database, and not performing any synchronization processing on the first data in the synchronization destination database; and performing second synchronization processing on all data in the synchronization destination database after performing the first synchronization processing, the all data having been in same transaction as the transaction in which the first data has been processed in the synchronization source database.

12. The data synchronization method according to claim 1, further comprising:

performing first monitoring for monitoring an update request for data, in the cache memory, synchronized in the first synchronization processing, after the first synchronization processing has been solely performed in the synchronization destination database, wherein the second synchronization processing is performed before the data is updated.

* * * * *